United States Patent
Chen et al.

(10) Patent No.: US 9,479,599 B2
(45) Date of Patent: Oct. 25, 2016

(54) REROUTE OF A WEB SERVICE IN A WEB BASED APPLICATION

(75) Inventors: Jing-tan T. Chen, Binghamton, NY (US); Gautam Majumdar, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 11/867,154

(22) Filed: Oct. 4, 2007

(65) Prior Publication Data

US 2009/0094314 A1   Apr. 9, 2009

(51) Int. Cl.
   *G06F 15/16* (2006.01)
   *H04L 29/08* (2006.01)

(52) U.S. Cl.
   CPC ........... *H04L 67/16* (2013.01); *H04L 67/2814* (2013.01)

(58) Field of Classification Search
   CPC .......................... H04L 67/16; H04L 67/2814
   USPC ......................................................... 709/246
   See application file for complete search history.

(56) References Cited

U.S. PATENT DOCUMENTS

| | | | | |
|---|---|---|---|---|
| 5,778,367 | A * | 7/1998 | Wesinger et al. | |
| 6,105,067 | A * | 8/2000 | Batra | 709/227 |
| 7,146,505 | B1 * | 12/2006 | Harada et al. | 713/185 |
| 8,898,191 | B2 * | 11/2014 | Kass | 707/781 |
| 2004/0205772 | A1 | 10/2004 | Uszok et al. | |
| 2005/0038708 | A1 | 2/2005 | Wu | |
| 2005/0050228 | A1 * | 3/2005 | Perham et al. | 709/246 |
| 2005/0086330 | A1 * | 4/2005 | Perham et al. | 709/220 |
| 2005/0132335 | A1 * | 6/2005 | Maron | 717/127 |
| 2007/0083639 | A1 * | 4/2007 | Gilbert et al. | 709/224 |
| 2007/0088794 | A1 * | 4/2007 | Akins et al. | 709/217 |
| 2007/0094364 | A1 | 4/2007 | Oberhauser | |
| 2007/0112948 | A1 * | 5/2007 | Uhlik | 709/223 |
| 2007/0136311 | A1 * | 6/2007 | Kasten et al. | 707/10 |
| 2007/0150610 | A1 * | 6/2007 | Vassilev et al. | 709/230 |
| 2008/0082569 | A1 * | 4/2008 | Mansour et al. | 707/102 |
| 2008/0120705 | A1 * | 5/2008 | Beyer et al. | 726/5 |
| 2008/0155557 | A1 * | 6/2008 | Bezrukov et al. | 719/316 |
| 2008/0172458 | A1 * | 7/2008 | Middleton et al. | 709/203 |
| 2008/0172496 | A1 * | 7/2008 | Middleton et al. | 709/246 |
| 2008/0176536 | A1 * | 7/2008 | Galluzzo et al. | 455/414.1 |
| 2009/0037879 | A1 * | 2/2009 | Iyengar et al. | 717/121 |
| 2009/0077210 | A1 * | 3/2009 | Musman et al. | 709/223 |
| 2010/0132024 | A1 * | 5/2010 | Ben-Natan et al. | 726/9 |

FOREIGN PATENT DOCUMENTS

WO   2005/060203   6/2005

OTHER PUBLICATIONS

Sonntag, M.; "Agents as Web service providers: single agents or MAS?", Applied Artificial Intelligence, vol. 20, No. 2-4, Abstract, Feb.-Apr. 2006.

* cited by examiner

*Primary Examiner* — Jerry Dennison
(74) *Attorney, Agent, or Firm* — John Pivnichny; Andrew M. Calderon; Roberts, Mlotkowski, Safran, Cole & Calderon, P.C.

(57) ABSTRACT

The invention relates to systems and method for rerouting web service messages. A method for performing web services includes receiving a web service request from a client, rerouting the web service request to a server, receiving results of the web service request, and sending the results of the web service request to the client. The rerouting can be used with messages/requests formulated in Simple Object Access Protocol (also referred to as Service Oriented Architecture Protocol, or simply SOAP).

20 Claims, 4 Drawing Sheets

REROUTE OF A WEB SERVICE IN A WEB BASED APPLICATION

FIELD OF THE INVENTION

The invention generally relates to systems and methods for performing web services, and, more particularly, to systems and methods for rerouting a web service in a web based application.

BACKGROUND OF THE INVENTION

Web applications are ubiquitous in today's networked computing culture, and are used for many purposes including webmail, online auctions, discussion boards, etc. Generally speaking, web applications involve a request generated at a client computing device (e.g., via a web browser) and executed at a server computing device, with the results of the request returned to the client computing device. The server often accesses a database to execute the client request. Moreover, it is well known that a first server receiving a client request may redirect the request to a second server. The second server executes the request and communicates the results back to the client, without communicating back through the first server.

One particular example of a web application is the Contractor Sourcing Application (CSA) developed by International Business Machines Corporation of Armonk, N.Y. CSA is an HTTP-based application that allows a user to locate candidates for job openings. In the CSA web application, a common server provides a URL for a user to log into the CSA web application. When the user's ID and password are accepted by the common server, the common server uses the well known and commonly used "redirect" methodology to pass the user's HTTP request to one of many remote servers. The remote server to which the request was redirected accesses a database in response to the HTTP request, and communicates results of the request to the user. In known redirect schemes, the remote server communicates substantially directly with the client after the remote server receives the redirected request, such that the common server does not act as an intermediary for communication between the remote server and the client. The common server and remote server/database architecture is efficient at least for the reason that each remote database may be kept relatively small, which reduces computing time for the required database operations.

Service oriented architecture (SOA) is a computing architecture in which services (e.g., web services) are made available for use by applications. Typically, web services comprise programming functions (i.e., software components) and applications comprise programs that call the web services and receive data results from the called web services. A particular example of a web service is CSAWS (CSA Web Service), which allows a user that is already logged into a first application to generate a CSA request without having to log separately into the CSA application. CSAWS is based upon the known Simple Object Access Protocol (also referred to as Service Oriented Architecture Protocol, or simply SOAP), and generates a CSA request as a SOAP message/request.

However, while known redirect technology works well with HTTP-based applications, it is common knowledge that existing redirect technology does not function with SOAP messages/requests. That is to say, a common server that receives a SOAP request from a client cannot simply redirect the SOAP request to a remote server, because the redirect operation does not provide such functionality. This is because SOAP and HTTP are different protocols, and redirect is designed to function with HTTP but not SOAP. As such, a CSA common server that receives a SOAP request cannot use redirect technology to pass the request to one of the remote servers.

Accordingly, there exists a need in the art to overcome the deficiencies and limitations described hereinabove.

SUMMARY OF THE INVENTION

In a first aspect of the invention, a method for performing web services includes: receiving a web service request from a client, sending the web service request to a server, receiving results of the web service request, and sending the results of the web service request to the client.

In another aspect of the invention, a method for handling web services comprises providing a computer infrastructure structured and arranged to: receive a web service request from a web services client, and send the web service request to one of a plurality of web applications servers. The computer infrastructure is further operable to receive a result of the web service request from the one of the plurality of web applications servers, and send the result of the web service request to the web service client.

In another aspect of the invention, a computer program product comprises a computer usable medium having a computer readable program embodied in the medium, wherein the computer readable program when executed on a computing device causes the computing device to: receive a web service request from a web services client; reroute the web service request to a server; receive a result of the web service request from the server; and send the result of the web service request to the web services client.

In another aspect of the invention, there is a system for processing web service requests. The system comprises a web services hosting server; and a plurality of web applications servers, each being associated with a respective web applications database. The web services hosting center is structured and arranged to receive, as a host, a web service request from one of a plurality of web services clients. The web services hosting center is also structured and arranged to send, as a client, the web service request to one of the plurality of web applications servers. The web services hosting center is further structured and arranged to receive, as a client, a result of the web service request from the one of the plurality of web applications servers. Lastly, the web services hosting center is additionally structured and arranged to send, as a host, the result of the web service request to the one of the plurality of web services clients.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention generally relates to systems and methods for performing web services, and, more particularly, to systems and methods for rerouting a web service in a web based application. In implementations of the invention, rerouting of web service (e.g., SOAP) messages is provided, such that web service (e.g., SOAP) messages can be used with a common server and remote server/database architecture. In this manner, any web service can benefit from the many advantages that advanced web application system architecture can provide.

Figure 1:
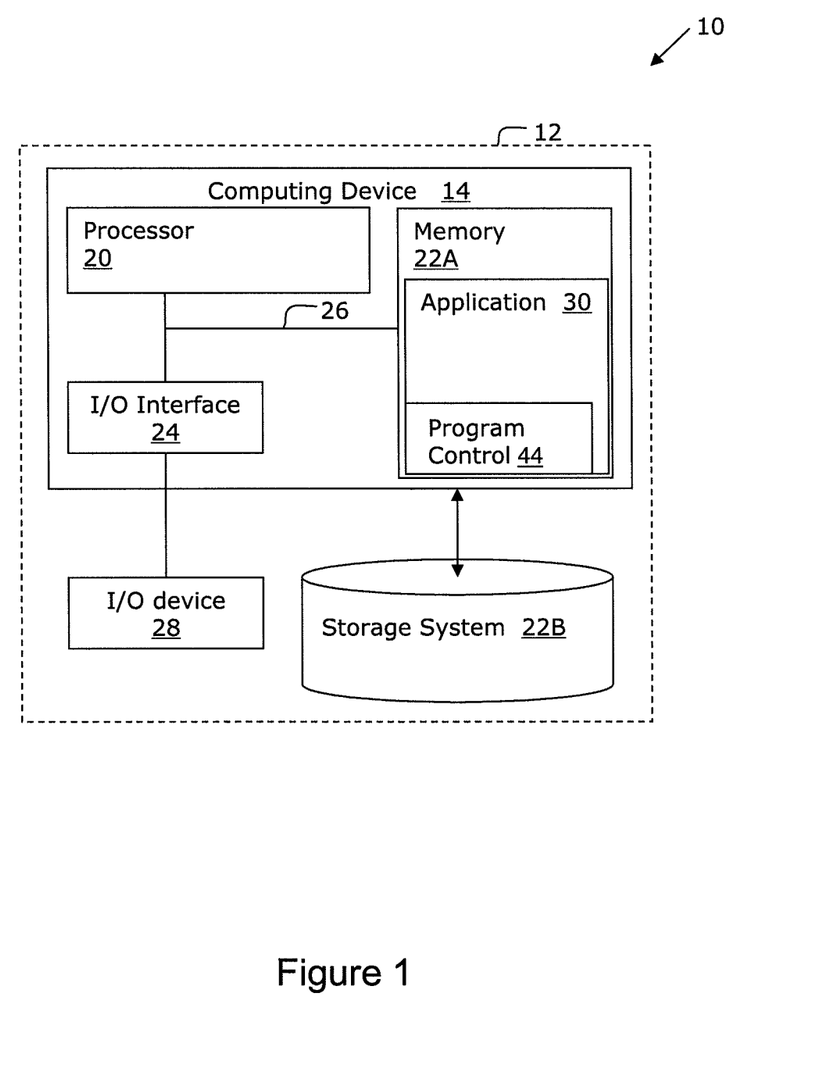
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises an application 30 having a program control 44, which makes the computing device 14 operable to perform the processes described herein, such as, for example, rerouting of web services. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code (e.g., program control 44) in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

The processor 20 executes computer program code (e.g., program control 44), which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, wireless notebook, smart phone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein, such as, for example, provide rerouting of web services. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Figure 2:
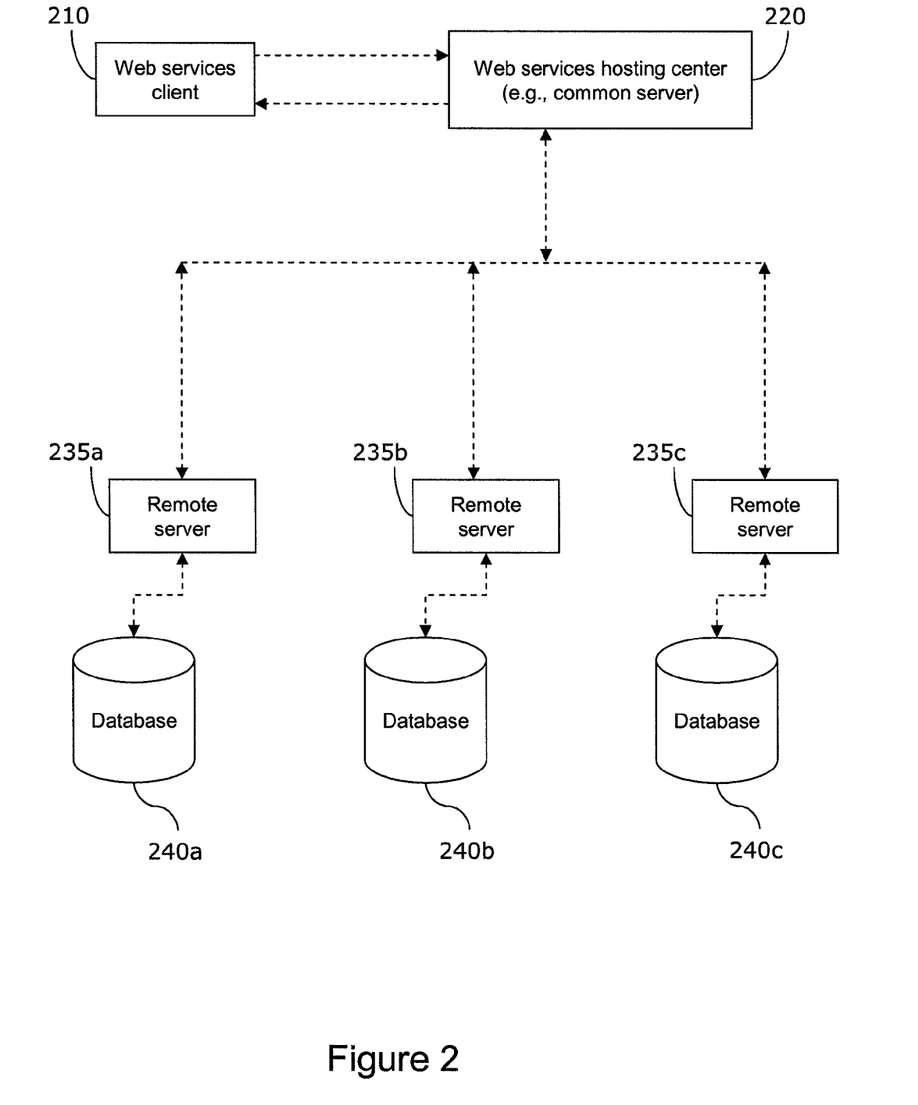
FIG. 2 shows an exemplary system for accommodating web service messages according to aspects of the invention.

FIG. 2 shows a system for handling web service messages according to aspects of the invention. In embodiments, the system comprises a web services client 210, which comprises a computing device such as, for example, that described with respect to FIG. 1. The web services client 210 communicates with a web services hosting center (e.g., common server) 220, which includes at least one computing device such as that described with respect to FIG. 1. The client 210 and common server 220 communicate over a network, such as, for example, a LAN, WAN, intranet, the Internet, etc. Moreover, although one client 210 is shown, there may be any number of clients connected to and communicating with the common server 220.

Also shown in FIG. 2 are three remote servers 235a, 235b, 235c, each of which may comprise at least one computing device such as that described with respect to FIG. 1. Each remote server may be associated with a particular geographic region; for example, remote server 235a may be associated with the Americas, remote server 235b may be associated with Europe, and remote server 235c may be associated with Asia/Pacific. Although three remote servers are shown, the invention is not limited to this number, and any suitable number of remote servers may be used with the invention. Moreover, the geographic association described herein are merely exemplary, and are not intended to limit the invention.

Each remote server has its own associated database instance 240a, 240b, 240c. For example, the databases may be DB2 (a registered trademark of International Business Machines Corp. in the United States, other countries, or both) universal databases, although any suitable database may be used with the invention. The remote servers 235a, 235b, 235c and databases 240a, 240b, 240c are connected to the common server 220 via a network (e.g., LAN, WAN, intranet, the Internet).

In the example of a CSA web application, the databases 240a, 240b, 240c contain data that is used for processing a response to a client request to locate candidates for job openings. For example, in an embodiment of the invention, the remote servers 235a, 235b, 235c and remote databases 240a, 240b, 240c constitute web applications servers and databases, respectively, that are provided with appropriate hardware and/or software for implementing the CSA web application. In further embodiments of the invention, appropriate portions of CSAWS (CSA Web Service) programming are also deployed on the client 210, common server 220, and remote servers 235a, 235b, 235c.

In the system shown in FIG. 2, the common server 220 additionally includes programming (e.g., Java code) that allows the common server 220 to reroute a SOAP message/request received from the client 210 to an appropriate remote server (e.g., 235a, 235b, 235c) for processing. The rerouting programming operates to cause the common server 220 to, among other things: act as a host when receiving a SOAP message/request (e.g., a CSAWS message/request) from the client 210; determine from the SOAP message/request which remote server (e.g., 235a, 235b, 235c) the request is appropriate for; act as a client and send the SOAP message/request to the appropriate remote server (e.g., 235a, 235b, 235c); act as a client and receive results of the processed request from the remote server (e.g., 235a, 235b, 235c); and act as a host and return the results to the client 210.

By acting as both a client and a host for different parts of the handling of the SOAP message/request, the common server 220 is able to reroute a SOAP message/request to the appropriate remote server (e.g., 235a, 235b, 235c). In this manner, the remote servers (e.g., 235a, 235b, 235c) access the respective databases and process the requests. As such, implementations of the invention allow the common server to take advantage of the benefits provided by plural web applications servers and databases, as are typically used in a web application system (e.g., a common server and remote server/database architecture).

In contrast to the system described above with respect to FIG. 2, FIG. 3 shows an exemplary system for processing web service messages without using the above-described rerouting. Generally speaking, the system depicted in FIG. 3 comprises a common server and remote server/database architecture, and specifically includes a web services client 310, which comprises a computing device such as, for example, a desktop computer having at least a processor, a memory, an input/output interface, and a bus. The web services client 310 communicates with a web services hosting center (e.g., common server) 320, which includes at least one computing device such as that described above with respect to the client 310. The client 310 and common server 320 communicate over a network, such as, for example, a LAN, WAN, intranet, the Internet, etc.

Figure 3:
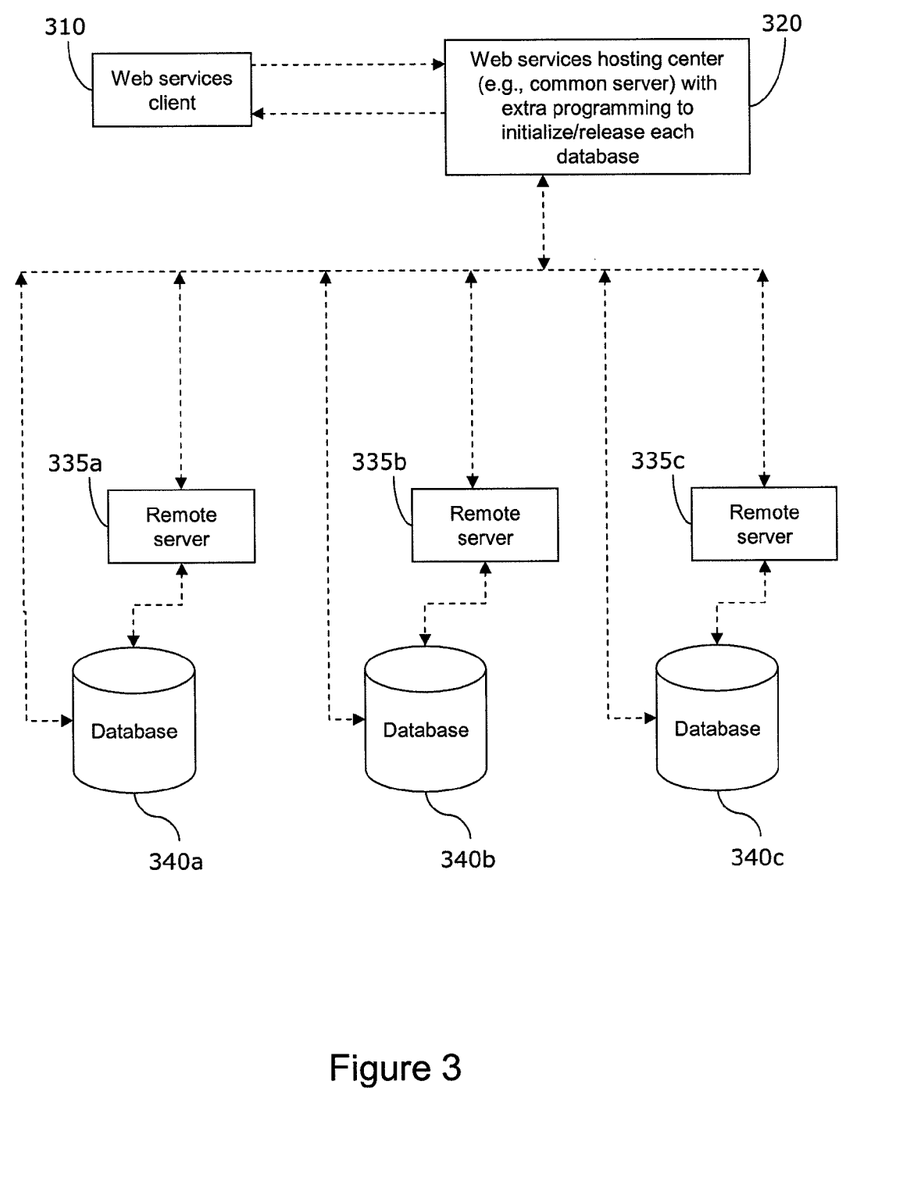
FIG. 3 shows an exemplary system for accommodating web service messages.

Also shown in FIG. 3 are three remote servers 335a, 335b, 335c, each of which may comprise at least one computing device such as that described above with respect to the client 310. Each remote server may be associated with a particular geographic region; for example, remote server 335a may be associated with the Americas, remote server 335b may be associated with Europe, and remote server 335c may be associated with Asia/Pacific.

Each remote server has its own associated database instance 340a, 340b, 340c. For example, the databases may be DB2 (universal databases, although any suitable database may be used. The remote servers 335a, 335b, 335c and databases 340a, 340b, 340c are connected to the common server 320 via a network (e.g., LAN, WAN, intranet, the Internet).

In the example of a CSA web application, the databases 340a, 340b, 340c contain data that is used for processing a response to a client request to locate candidates for job openings. More specifically, appropriate portions of CSAWS (CSA Web Service) programming are deployed on the client 310, common server 320, and remote servers 335a, 335b, 335c. However, when the client 310 generates a CSAWS SOAP message/request, the common server 320 cannot simply redirect the message to one of the remote servers 335a, 335b, 335c because, as already described herein, redirect does not work with SOAP messages/requests.

Because the common server 320 cannot utilize known "redirect" web technology to redirect a SOAP message/request to one of the remote servers in the system shown in FIG. 3, the common server 320 assumes the role of handling the client request. That is, the common server 320 is provided with appropriate programming code that operates to cause the common server 320 to determine the appropriate database (e.g., 340a, 340b, 340c) from the SOAP message/request, initiate a connection (e.g., a DB2® connection) with the appropriate database, access the database to gather data to process the request, release (i.e., close) the connection to the database, process the data to handle the request, and communicate the results back to the client.

Thus, the common server 320 in the system shown in FIG. 3 performs all of the work in handling each request from every client 310. This is inefficient, however, because the common server 320 must initiate and release a database connection each time a client request is made. Not only does this add workload to the common server 320, but also creates impacts on the remote servers 335a, 335b, 335c which have to handle the additional requests of constantly initiating/releasing various connections on different database instances 340a, 340b, 340c. Performing such tasks for each request of numerous clients negatively impacts the efficiency of the common server 320.

Moreover, the common server 320 in the system shown in FIG. 3 includes appropriate coding for accessing each particular database. This is because each database (e.g., 340a, 340b, 340c) may have unique rules and/or business processes for initiating and releasing connections and for accessing the data. Thus, the common server 320 contains redundant programming for handling the workload of accessing multiple databases. This disadvantageously results in additional development and maintenance to the CSA application as a whole. Implementations of the invention, however, avoid these disadvantages.

For example, in embodiments of the invention (such as, for example, the exemplary implementation depicted in FIG. 2) the common server does not connect to the remote databases, but instead connects to the remote servers. In this manner, each remote server reuses its existing connection with its associated database, without the need for creating a new set of code for repeatedly initializing/releasing connections from the common server to the different database instances. Put another way, the SOAP messages/requests are able to be rerouted to a proper existing internal web application server (e.g., remote server) which already has its database connection initialized and a database connection pool established when the remote server starts. This rerouting eliminates the excessive workload performed by (and programming added to) the common server 310 described with respect to FIG. 3.

Moreover, embodiments of the invention (such as, for example, the implementation depicted in FIG. 2) allow a developer to reuse the same WSDL (Web Services Description Language) file to generate the same set of web services API code and deploy it to multiple servers. This simplifies the development process and reduces development effort and future maintenance for the web application system.

Additionally, in a preferred embodiment directed to implementation with CSA and CSAWS, aspects of the invention provide for the beneficial use of already developed (e.g., existing) CSA common process and domain objects. This makes CSAWS code development much simpler. Reusing existing business process objects also makes future maintenances of CSA web system easier without having any duplicated and redundant code objects, which meets the goals of object-oriented architecture.

Processes of the Invention

The steps of the flow diagrams described herein may be implemented in the environment of FIGS. 1 and/or 2. The flow diagrams may equally represent a high-level block diagram of the invention. The steps of the flow diagrams may be implemented and executed from a server, in a client-server relationship, by computing devices in an ad hoc network, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environments of FIGS. 1 and/or 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 4:
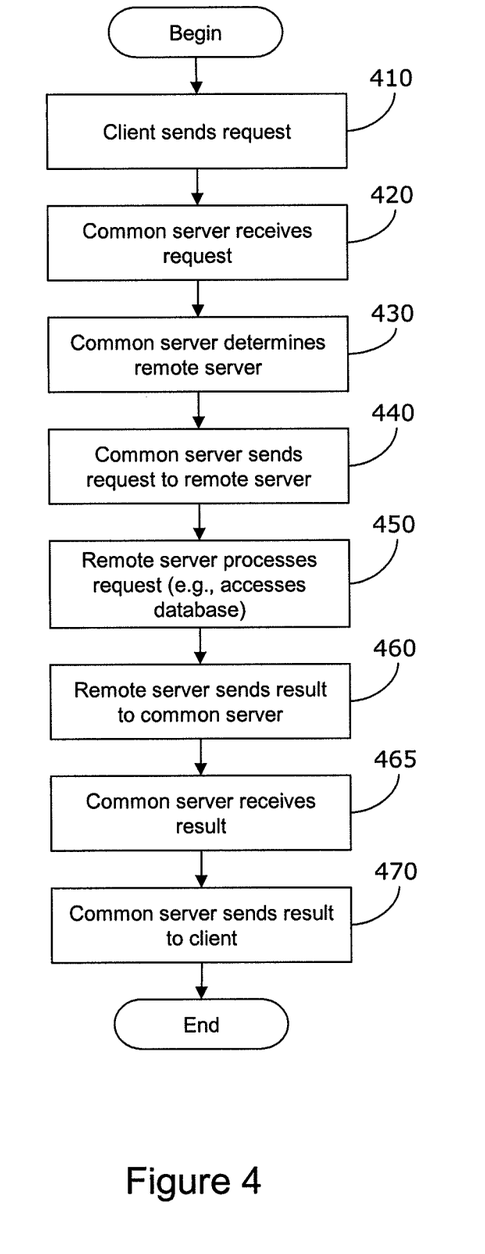
FIG. 4 shows a flow diagram depicting implementations of a method according to aspects of the invention.

FIG. 4 shows a flow diagram depicting steps of a first method for accommodating web service messages according to aspects of the invention. At step 410, a client generates and sends a request to a common server. In embodiments, this comprises a SOAP message request, such as, for example, a CSAWS request. The client and common server may be similar to those described above with respect to FIG. 2, with the request being transmitted as data over a network.

At step 420, the common server receives the request. For example, the common server acts as a host that receives data packets from the client. Then, at step 430, the common server determines the remote server to which the request will be sent for processing. In embodiments, this is accomplished by programming code resident on the common server that looks at data contained within the SOAP message/request to determine which remote server is suited for handling the request.

At step 440, the common server sends the request to the remote server previously determined in step 430. For example, the common server acts as a client and sends client data packets to the remote server. At step 450, the remote server receives the request and processes the request. In embodiments, this comprises the remote server accessing its associated database and gathering and processing data in accordance with the request. For example, this may comprise processing a CSA request by accessing CSA data in the database.

At step 460, the remote server sends the results of the request to the common server. Accordingly, at step 465, the common server, still acting as a client, receives the results from the common server. Then, at step 470, the common server acts as a host and sends the results to the client. In embodiments, the functions of the common server (e.g., steps 420, 430, 440, 465, 470) are performed by any suitable combination of hardware and/or software (e.g., Java code) comprised in the common server.

As should be apparent from the description above, embodiments of the invention allow the common server to reroute SOAP messages/requests to an appropriate remote server, where the request is handled by the remote server. Unlike known redirect technology, implementations of the invention work (i.e., function properly) with SOAP messages/requests. Also, in contrast to known redirect technology, the common server acts as both a client and a host in that it receives a SOAP message/request from a client, determines from the message/request which remote server to send the message/request to, sends the message/request to the appropriate remote server, receives results from the remote server, and sends the results to the client.

While the invention has been described in terms of embodiments, those skilled in the art will recognize that the invention can be practiced with modifications and in the spirit and scope of the appended claims.

What is claimed:

1. A method for performing web services, comprising:
receiving a web service request arranged in SOAP protocol from a client at a web services hosting server;
rerouting the received web service request arranged in SOAP protocol to a server by acting as the client and rerouting the request to an existing connection to the server based on an identity of the server;
receiving results of the web service request from the server;
sending the results of the web service request to the client; and
determining, prior to rerouting the received web service request arranged in SOAP protocol, the identity of the server to which the web service request is sent, from among a plurality of servers, each respectively connected to an associated database, by extracting, based on programming code resident in the web services hosting server, the identity of which one of the plurality of servers is best suited to handle the web service request in SOAP protocol from data contained within the web service request, wherein the determining is performed by the web services hosting server,
wherein the server reuses an existing database connection to the database respectively associated with the server, such that the database connection has already been initialized and a database connection pool has already been established before the web server request is rerouted to the server,
wherein the web service hosting server sends the results of the web service request received from the server to the client in SOAP protocol without having to convert the results of the web service request from the server into a new format, and
wherein the web services hosting server reuses a same Web Services Description Language (WSDL) file to generate a same set of web services code to deploy to each of the plurality of servers.

2. The method of claim 1, wherein the web services hosting server performs the receiving the web service request from the client, the sending the web service request to the server, the receiving results of the web service request, and the sending the results of the web service request to the client.

3. The method of claim 2, wherein the server is one of a plurality of web applications servers accessible by the web services hosting server.

4. The method of claim 3, wherein each of the plurality of web applications servers communicates with a respective web applications database.

5. The method of claim 2, wherein:
the web services hosting server functions as a host when performing the receiving a web service request from a client, and when performing the sending the results of the web service request to the client, and
the web services hosting server functions as the client when performing the sending the web service request to the server, and when performing the receiving results of the web service request.

6. The method of claim 1, wherein the steps of claim 1 are provided by a service provider under at least one of: a subscription, fee agreement, and based on advertising content to one or more third parties.

7. The method of claim 1, wherein a service provider at least one of creates, maintains, deploys and supports a computer infrastructure that performs at least one of the steps of claim 1.

8. A method for handling web services, comprising:
providing a computer infrastructure structured and arranged to:
receiving a web service request arranged in a SOAP protocol from a client at a web services hosting server;
rerouting the web service request arranged in SOAP protocol to a server by acting as the client and rerouting the request to an existing connection to the server based on an identity of the server;
receiving results of the web service request from the server; and
sending the results of the web service request to the client,
wherein the web services hosting server comprises programming code that operates to cause the web service hosting server to determine, based on programming code resident in the web services hosting server, prior to rerouting the received web service request arranged in SOAP protocol, the identity of the server, from among a plurality of servers, best suited to handle the web service request by analyzing data contained within the web service request,
wherein each of the plurality of servers is respectively connected to an associated database, and wherein the server reuses an existing database connection to the database respectively associated with the server, such that the database connection has already been initialized and a database connection pool has already been established before the web server request is rerouted to the server,
wherein the web service hosting server sends the results of the web service request received from the server to the client in SOAP protocol without having to convert the results of the web service request from the server into a new format, and
wherein the web services hosting server reuses a same Web Services Description Language (WSDL) file to generate a same set of web services code to deploy to each of the plurality of servers.

9. The method of claim 8, wherein the computer infrastructure comprises a web services hosting server.

10. The method of claim 9, wherein,
the web services hosting server functions as a host when receiving the web service request from the web services client, and when sending the result of the web service request to the web services client, and
the web services hosting server functions as the client when sending the web service request to the one of the plurality of web applications servers, and when receiving the result of the web service request from the one of the plurality of web applications servers.

11. The method of claim 9, wherein:
the web services client is one of a plurality of web services clients, and
the web services hosting server is arranged to reroute web services requests from any of the plurality of web service clients.

12. A computer program product comprising a computer usable medium having a computer readable program embodied in the computer usable medium, the computer usable medium comprising one of semiconductor memory, solid state memory, magnetic tape, diskette, random access memory, read-only memory, rigid magnetic disk and optical disk, wherein the computer readable program when executed on a computing device is operable to cause the computing device to:
receive a web service request arranged in SOAP protocol from a web services client at a web services hosting server;
reroute the received web service request arranged in SOAP protocol to a server by acting as the client and based on an identity of the server determined from the web service request;
receive a result of the web service request from the server accessing a database within the established database connection pool; and
send the result of the web service request to the web services client,
wherein the web services hosting server comprises programming code that operates to cause the web service hosting server to determine, prior to rerouting the received web service request arranged in SOAP protocol, the identity of the server, from among a plurality of servers, best suited to handle the web service request by analyzing, based on programming code resident in the web services hosting server, data contained within the web service request,
wherein each of the plurality of servers is respectfully connected to an associated database, and wherein the server reuses an existing database connection to the database respectively associated with the server, such that the database connection has already been initialized and a database connection pool has already been established before the web server request is rerouted to the server,
wherein the web service hosting server sends the results of the web service request received from the server to the client in SOAP protocol without having to convert the results of the web service request from the server into a new format, and
wherein the web services hosting server reuses a same Web Services Description Language (WSDL) file to generate a same set of web services code to deploy to each of the plurality of servers.

13. The method of claim 12, wherein,
the computing device functions as a host when receiving the web service request from the web services client, and when sending the results of the web service request to the web services client, and
the computing device functions as the client when rerouting the web service request to the server, and when receiving the results of the web service request from the server.

14. A system for processing web service requests, comprising:
a web services hosting server; and
a plurality of web applications servers, each being associated with a respective web applications database,
wherein the web services hosting server is structured and arranged to:
receive, as a host, a web service request arranged in SOAP protocol from one of a plurality of web services clients;
determine, prior to rerouting the received web service request arranged in SOAP protocol, an identity of one of the plurality of web applications servers to which the web service request is to be sent by extracting, based on programming code resident in the web services hosting server, the identity of which one of the plurality of web application servers is best suited to handle the web service request in SOAP protocol from data contained within the web service request;
reroute, as a client, the web service request arranged in SOAP protocol to the one of the plurality of web applications servers based on the identity of the server determined from content of the web service request;
receive, as the client, a result of the web service request from the one of the plurality of web applications servers accessing a database within the established database connection pool; and
send, as a host without having to convert the result to a new format, the result of the web service request to the one of the plurality of web services clients,
wherein the web services hosting server comprises programming code that operates to cause the web service hosting server to determine the identity of the one of the plurality of web applications servers,
wherein each of the plurality of web application servers is respectively associated with a database, and wherein the one of the plurality of web application servers reuses an existing database connection to the database respectively associated with the one of the plurality of web application servers, such that the database connection has already been initialized and a database connection pool has already been established before the web server request is rerouted to the one of the plurality of web application servers,
wherein the web service hosting server sends the results of the web service request received from the one of the plurality of web application servers to the client in SOAP protocol without having to convert the results of the web service request from the one of the plurality of web application servers into a new format, and
wherein the web services hosting server reuses a same Web Services Description Language (WSDL) file to generate a same set of web services code to deploy to each of the plurality of web application servers.

15. The method of claim 3, wherein the web services hosting server is configured to reroute the web service request arranged in SOAP protocol to an appropriate one of the plurality of web applications servers.

16. The method of claim 15, wherein each one of a plurality of web applications servers is associated with a respective geographic region.

17. The method of claim 16, wherein the web services hosting server communicates with the client using a wired communications link.

18. The method of claim 1, wherein the web service request arranged in SOAP protocol rerouted to the server is the same request as the received web service request arranged in SOAP protocol.

19. The method of claim 18, wherein the web services hosting server is a common server requesting the web service request as the client.

20. The method of claim 1, wherein:
the web services hosting server acts as the client by acting as the originator for the web service request arranged in SOAP protocol and bypasses redirect technology.

* * * * *